No. 798,891. PATENTED SEPT. 5, 1905.
G. EISENKRAMER.
MEANS FOR APPLYING BRAKES TO VEHICLE AND OTHER WHEELS.
APPLICATION FILED MAY 6, 1905.
5 SHEETS—SHEET 1.

Witnesses
T. Castberg.
Bessie Gorfinkel.

Inventor
Gustav Eisenkramer.
By
F. M. Wright
Attorney

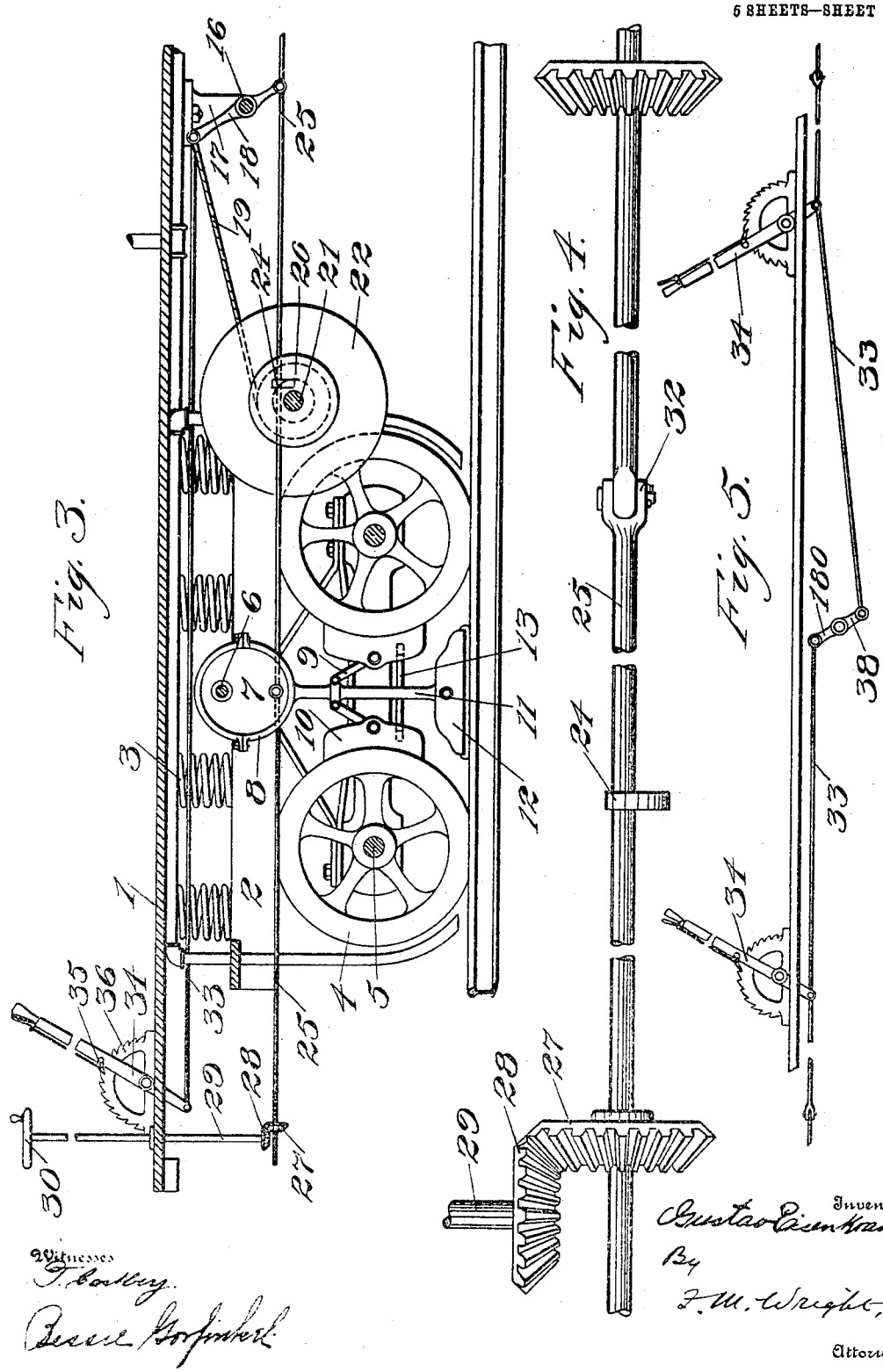

No. 798,891. PATENTED SEPT. 5, 1905.
G. EISENKRAMER.
MEANS FOR APPLYING BRAKES TO VEHICLE AND OTHER WHEELS.
APPLICATION FILED MAY 6, 1905.
5 SHEETS—SHEET 3.

No. 798,891. PATENTED SEPT. 5, 1905.
G. EISENKRAMER.
MEANS FOR APPLYING BRAKES TO VEHICLE AND OTHER WHEELS.
APPLICATION FILED MAY 6, 1905.
5 SHEETS—SHEET 4.
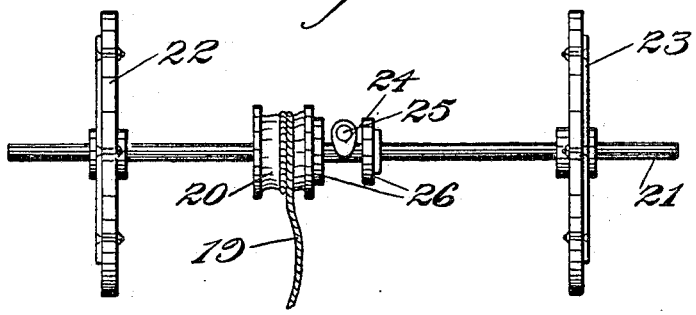
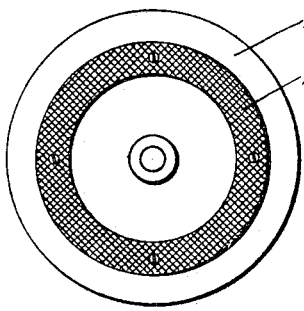  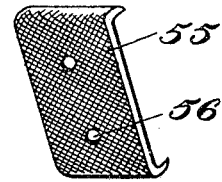
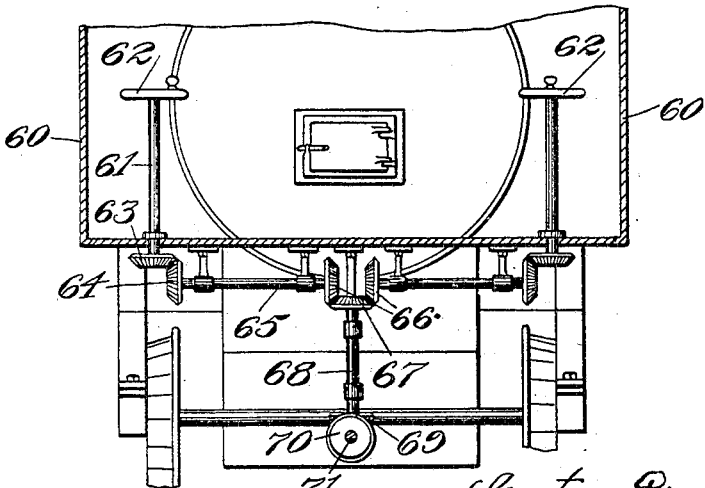
Witnesses
T. Castbey.
Bessie Forfinkel.
Inventor
Gustav Eisenkramer.
By
F. M. Wright
Attorney No. 798,891. PATENTED SEPT. 5, 1905.
G. EISENKRAMER.
MEANS FOR APPLYING BRAKES TO VEHICLE AND OTHER WHEELS.
APPLICATION FILED MAY 6, 1905.
5 SHEETS—SHEET 5.
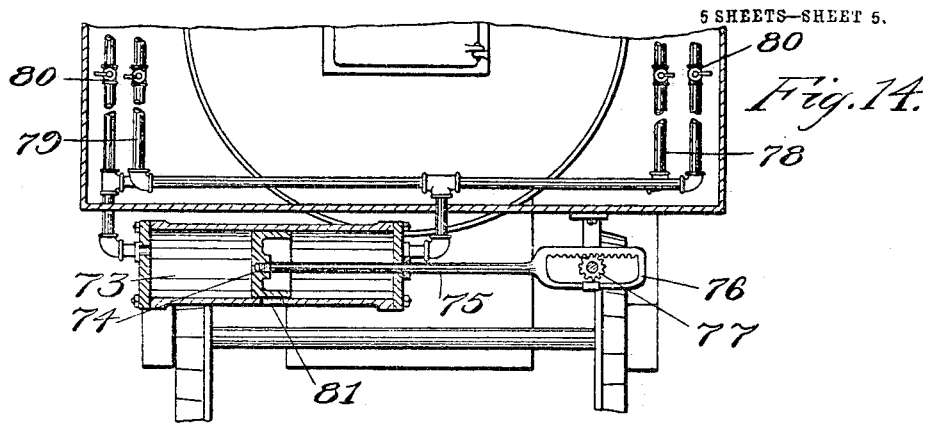
Fig. 14.
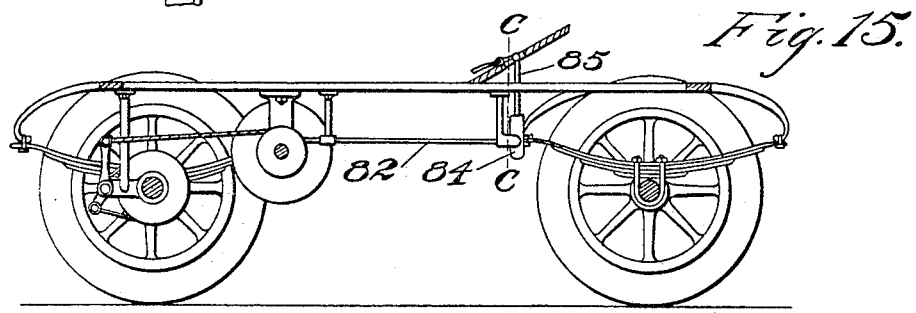
Fig. 15.
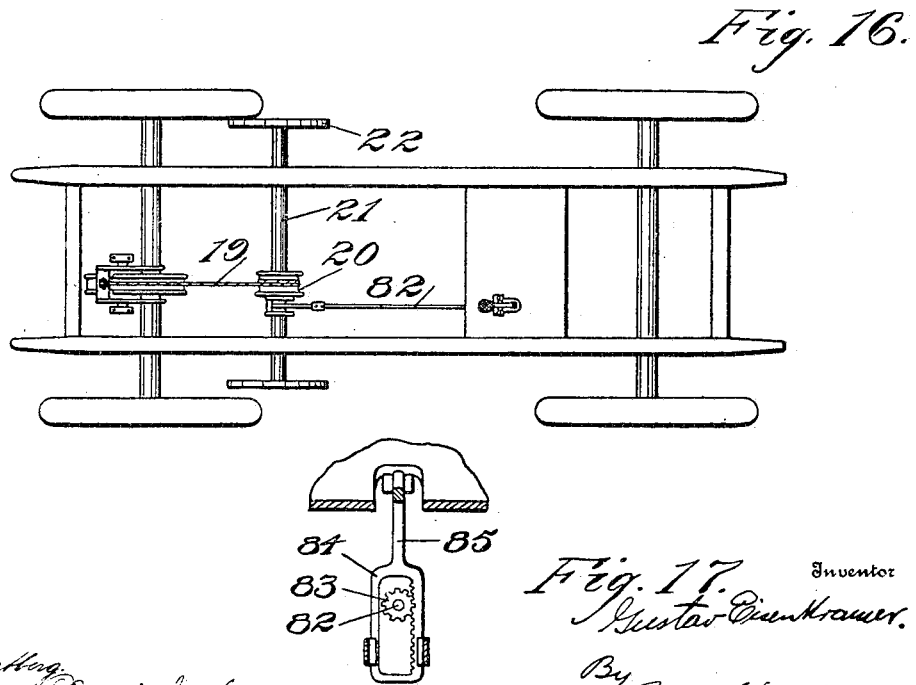
Fig. 16.
Fig. 17.
Witnesses
Inventor
Gustav Eisenkramer.
By F. M. Wright
Attorney

UNITED STATES PATENT OFFICE.

GUSTAV EISENKRAMER, OF SAN FRANCISCO, CALIFORNIA.

MEANS FOR APPLYING BRAKES TO VEHICLE AND OTHER WHEELS.

No. 798,891. Specification of Letters Patent. Patented Sept. 5, 1905.

Application filed May 6, 1905. Serial No. 259,215.

*To all whom it may concern:*

Be it known that I, GUSTAV EISENKRAMER, a citizen of the United States, residing at San Francisco, in the county of San Francisco and State of California, have invented certain new and useful Improvements in Means for Applying Brakes to Vehicle and other Wheels, of which the following is a specification.

This invention relates to improvements in brakes especially adapted for vehicle-wheels, the object of the invention being to provide a brake with which the force applied to set the brake is derived from the movement of the wheel itself instead of requiring external power for that purpose, said force thus continuing in action so long as the wheel is revolving. The advantages of this construction are that it requires far less exertion on the part of the operator to set the brake and also that it is more effective and certain in its action. Brakes operated by any other external power, as air-brakes, hand-brakes, magnetic brakes, or the like, may occasionally become ineffective through the deficiency of the power for applying the brake. In the present invention this is impossible, for the power for applying the power being the movement of the wheel itself so long as the wheel is in motion the power necessary for braking exists and can be applied therefor.

The invention also comprises means for preventing sliding of the wheel upon the rail in damp weather.

It also consists in the novel construction, combination, and arrangement of parts hereinafter fully specified, and particularly pointed out in the claims.

Figure 1:
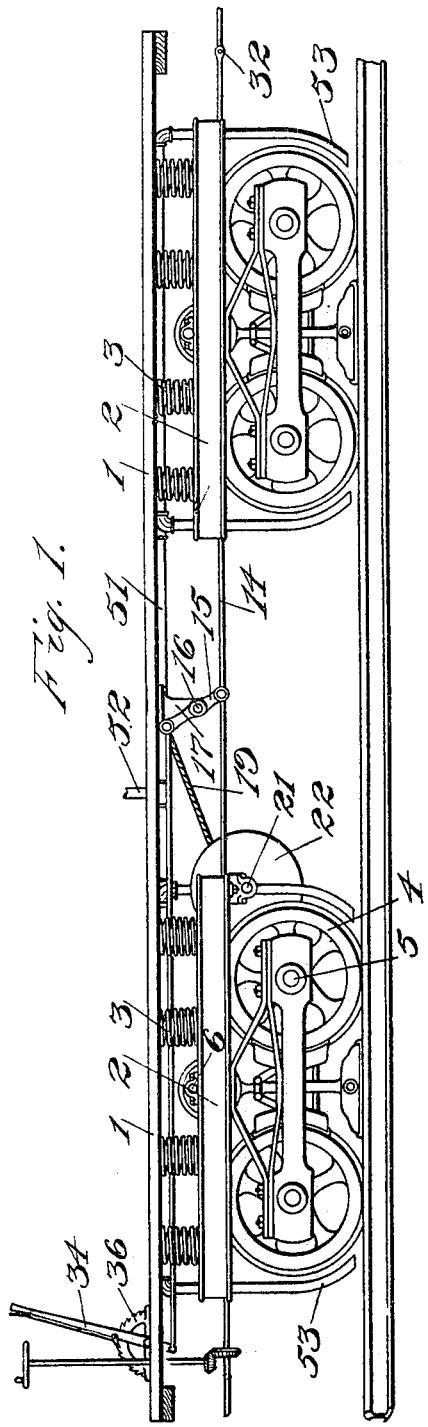
Figure 2:
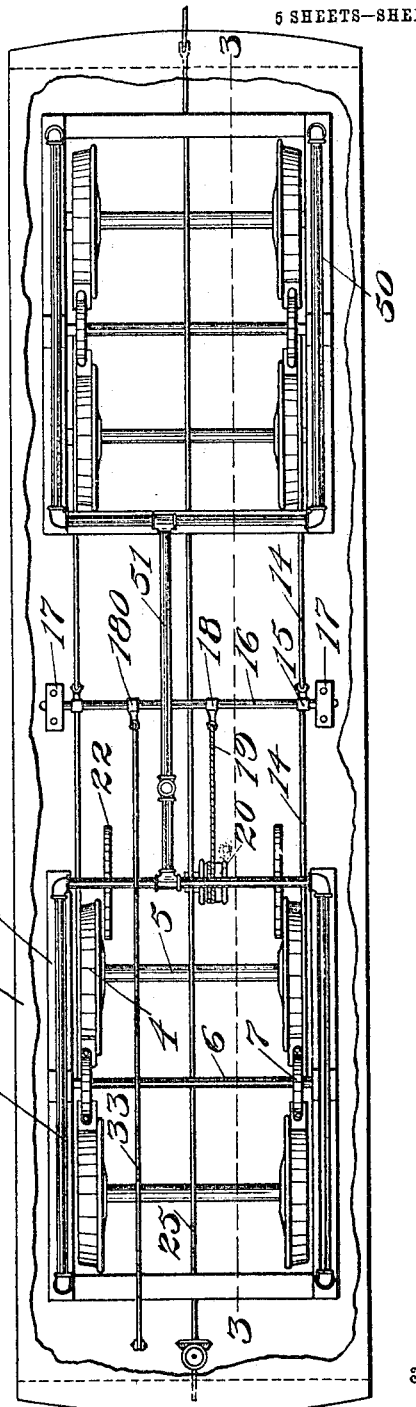
Figure 6:
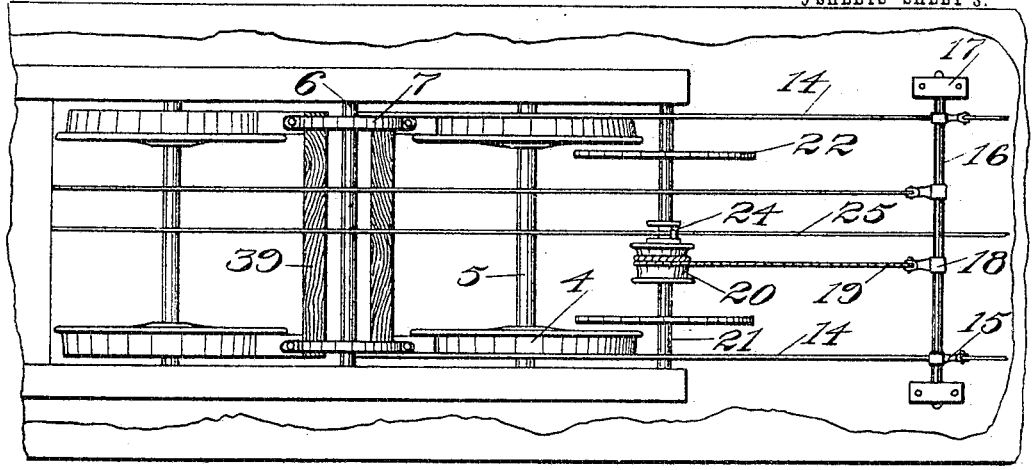
Figure 7:
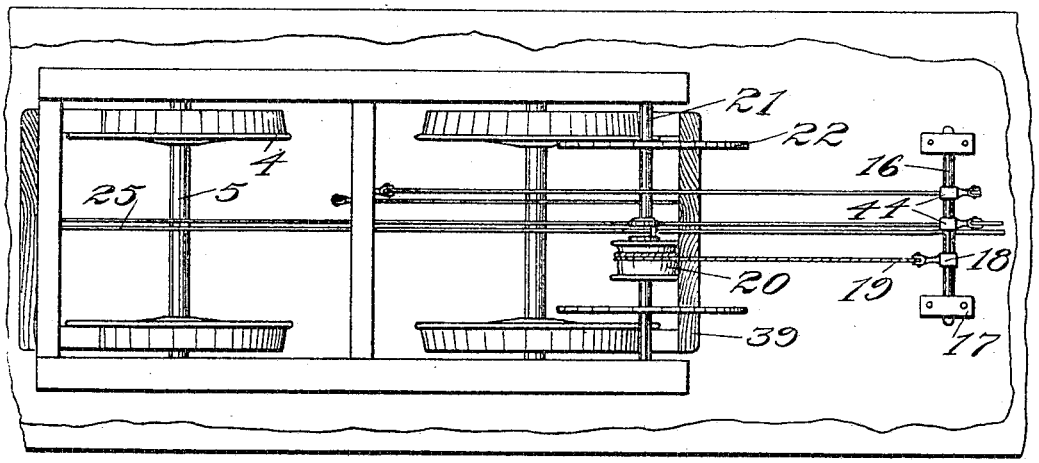
Figure 8:
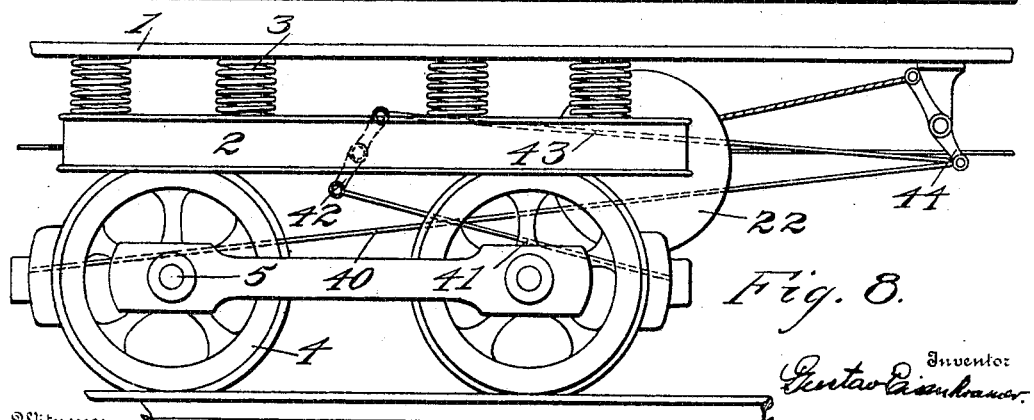

In the accompanying drawings, Figure 1 is a side elevation of a portion of a car equipped with my improved brakes. Fig. 2 is a broken plan view of the same. Fig. 3 is an enlarged vertical section on the line 3 3 of Fig. 2. Fig. 4 is a broken detail plan view, on an enlarged scale, of the longitudinal rod for applying the brake. Fig. 5 is a detail side elevation showing the connection for use with an electric car, so that the locking devices at both ends of the car may be operated at the same time. Fig. 6 is a broken plan view showing the invention applied to a car having brake-beams between the wheels. Fig. 7 is a similar view showing the invention applied to a car having brake-beams outside the wheels. Fig. 8 is a side elevation of the apparatus shown in Fig. 7. Fig. 9 is a detail front view of the friction-wheels and the shaft carrying the same. Fig. 10 is a side view of one of the friction-wheels. Fig. 11 is an edge view of the same. Fig. 12 is a perspective view of a cap for a brake-shoe. Fig. 13 is a vertical cross-sectional view of a cab of a locomotive, showing the apparatus mounted therein. Fig. 14 is a similar view showing a modification of the means for applying the brake. Fig. 15 is a longitudinal section of the frame and wheels of an automobile, showing the means for applying the brake to the wheels thereof. Fig. 16 is a plan view of the same. Fig. 17 is an enlarged vertical section on the line C C of Fig. 15.

Referring to the drawings, 1 represents the body of a car, and 2 represents the truck-frames upon which said car is mounted by springs 3.

4 represents the wheels mounted on shafts 5, journaled in the trucks.

Upon a transverse shaft 6 secured to the truck is mounted an eccentric 7, the collar 8 of which is attached by links 9 to brake-shoes 10, which engage the wheels of the truck, and by a link 11 to a shoe 12, which engages the rail.

13 is a rod which enters recesses in the two brake-shoes and maintains them in the proper relative position. To move the eccentrics so as to apply the brake-shoes, said eccentrics are attached to rods 14, secured to arms 15 on a rock-shaft 16, pivoted in hangers 17, said shaft carrying an arm 18, attached to a rope or cable 19, which is wound around a drum 20 upon a transverse shaft 21. This transverse shaft has at each end a friction-wheel 22, having a roughened surface 23, adapted to engage the side of the car-wheel when the shaft 21 is moved longitudinally of itself or transversely of the car. In order to so move said shaft longitudinally, there is provided a cam 24 upon a longitudinal shaft 25, said cam working between collars 26 upon the transverse shaft 21. Thus by rocking said longitudinal shaft 25 about its own axis in either direction the cam engages one or the other of said collars and moves the transverse shaft endwise, thereby bringing one of the friction-wheels 22 into engagement with the car-wheel. The shaft 25 may be rocked about its own axis by any suitable means. I have here shown a beveled wheel 27 on said shaft engaged by a beveled wheel 28 on a vertical shaft 29, extending through the end of the car and carrying at its upper end a hand-wheel 30. By turning said hand-wheel the vertical shaft, and also the longitudinal shaft 25, are turned, and thus the transverse shaft 21 is moved endwise, bringing one of the friction-wheels against a car-wheel. The effect of this is to cause the friction-wheel to rotate so long as the car-wheel itself is in motion. This winds up the rope or cable 19, attached to the arm 18, and thereby through the rods 14 operates the eccentrics to set all the brake-shoes. It will thus be seen that I utilize the motion of the wheels themselves to apply the brakes thereto. The only exertion made by the brakeman is to shift the friction-wheels laterally, and he does not apply any of the braking force, this braking force being applied wholly by the momentum of the car exerted through the motion of the car-wheels.

It will be seen from Fig. 4 that the shaft 25, which so shifts these friction-wheels laterally, is jointed, as shown at 32, thereby permitting said shaft to bend with the motion of the car in traveling around curves.

It is desirable to provide means whereby when the brake has once been set it can remain set without the attention of the operator. For this purpose there is attached to the end of the arm 180 a rod 33, which is secured to the lower end of a rocking lever 34, having a spring-actuated dog 35, engaging a circular rack 36. When the arm 18 is moved to set the brake, it will remain in such position on account of the engagement of the dog with the rack. By disengaging the dog by hand the brake can be released. In Fig. 5 is shown provision whereby this locking-lever may be simultaneously set at both ends of the car. In this case two rods 33 are provided running from the ends of two arms 180 38 to locking-levers at opposite ends of the car.

In the modification shown in Fig. 6 the brake-shoes are shown as attached to brake-beams 39, and in the modification shown in Figs. 7, 8 these brake beams and shoes are shown outside the wheels and are operated by rods 40 41, the rods 40 being attached to the lower ends of the arms 44 and the rods 41 being attached to the lower ends of levers 42, the upper ends of which are attached by links 43 to said arms 44.

When rails are neither dry nor thoroughly wet, they are in an extremely slippery condition, and under such circumstances the wheels do not take sufficient hold upon the rails. One feature of my invention consists in a provision whereby at such times water can be applied to the rails to thoroughly wet the same, so that the wheels will hold thereon and enable the car to ascend steep grades. For this means there are provided, as shown in Figs. 1 and 2, water-pipes 50, which pass above the wheels of the trucks on both sides and are connected by pipes 51 to a supply-pipe 52. These water-pipes discharge by means of vertical pipes 53 at points over or adjacent to the rails, thus thoroughly wetting the rails and enabling the wheels to take hold of the same.

In connection with this invention I provide an improved brake-shoe 10, the improvement consisting of a removable face-plate 55, which can be secured to the face of the shoe by screws through holes 56.

In Fig. 13 is illustrated means whereby the brakes can be secured upon a locomotive, and in such manner that in case of accident when it is necessary for the engineer and fireman to jump from the locomotive to save their lives they may immediately before doing so set the brakes to stop the train. For this purpose at each side of the cab 60 of the locomotive there is secured a vertical shaft 61, carrying at the top a hand-wheel 62 and at the bottom a bevel-gear 63, meshing with a bevel-gear 64 on a horizontal shaft 65, carrying at the other end a bevel-gear 66. These two bevel-gear 66 mesh with a bevel-gear 67 upon a vertical shaft 68, having at the bottom a bevel-gear 69, meshing with a bevel-gear 70 on a horizontal shaft 71, which acts in like manner as the shaft 25. (Shown in Figs. 1 and 2.) Thus either the engineer or the fireman is in position immediately after setting the brake to jump from the cab of the locomotive in case of accident.

In Fig. 14 is shown a modification in which this rod for setting the brake is turned by the action of steam. In this case there is provided beneath the cab of the locomotive a cylinder 73, having a piston 74 therein, and a piston-rod 75, carrying at its outer end a rack 76, which engages a pinion 77 upon the shaft 25, which sets the brake. In order to admit steam to this cylinder from either side of the cab, two sets of pipes are provided, leading to each side of the cab, those, 78, to one side to be controlled by the engineer, and those leading to the other side, 79, to be controlled by the fireman, both pipes having suitable valves 80 therein. The piston 74 having moved over toward either end to set the brake, the steam for impelling said piston is then allowed to escape through a hole 81 in the side of the cylinder.

Figs. 15, 16, and 17 show the mode in which the brake is applied to an automobile. In this case there is provided a pair of friction-wheels in like manner as before, one or other of which is brought into engagement with the driving-wheel on that side by the same means as before, being actuated by a shaft 82, which is turned about its axis by means of a pinion 83, rotated by means of a rack 84, carried by a vertical shaft 85, extending through the body of the automobile. Upon raising or lowering said vertical shaft the shaft 82 is turned, thereby setting the brakes.

In addition to the advantages already specified in the statement of invention the following advantages may be noted: Although the brake-beams are shown in certain modifications of my invention, yet in general they may be dispensed with. I also do away with an extra set of machinery to press the track-brakes onto the track or to release the same from the track. The wheel and track brakes, are simultaneously pressed against the wheels and track, and the effect of the track-brake in tending to stop the car or cars reduces the amount of pressure necessary to be applied to the wheel-brakes, so that said brakes, not being subjected to so severe usage as heretofore, will last longer. The application of water enables the wheels to grip the track and prevents them sliding along when the brakes are applied. All brakes are set at exactly the same time whether on one car or any number.

I claim—

1. In a braking apparatus, the combination, with the brakes, of a transverse shaft, a friction-wheel thereon arranged to be moved into contact with a wheel of the vehicle to be arrested, a drum on said shaft, a rope around said drum, an operative connection between said rope and the brakes whereby the winding of the rope upon the drum sets the brakes, and means for moving the shaft longitudinally to so move said friction-wheel, substantially as described.

2. In a braking apparatus, the combination, with the brakes, of a transverse shaft, a friction-wheel thereon arranged to be moved into contact with a wheel of the vehicle to be arrested, a drum on said shaft, a rope around said drum, an operative connection between said rope and the brakes whereby the winding of the rope upon the drum sets the brakes, means for moving the shaft longitudinally to so move said friction-wheel, and automatic means for locking the brakes so set, substantially as described.

3. In a braking apparatus, the combination with the brakes, of a shaft, a pair of friction-wheels thereon, means for moving said shaft longitudinally whereby one or the other of said friction-wheels is brought into contact with a wheel to be arrested, and an operative connection between said shaft and the brakes whereby they are set by the motion of said friction-wheels, substantially as described.

4. In a braking apparatus, the combination with the brakes, of a transverse shaft, a pair of friction-wheels thereon, means for moving said shaft longitudinally comprising collars on said shaft, an eccentric between said collars and a longitudinal shaft whereupon said eccentric is mounted, a drum on said shaft and a connection from said drum to the brakes whereby the rotation of said shaft sets said brakes, substantially as described.

5. In a braking apparatus, the combination with the brakes, of a transverse shaft, a pair of friction-wheels thereon, means for moving said shaft longitudinally comprising collars on said shaft, an eccentric between said collars and a longitudinal shaft upon which said eccentric is mounted, a drum on said shaft, a connection from said drum to the brake whereby the rotation of said shaft sets said brakes, and automatic means for locking the brakes so set, substantially as described.

6. In a braking apparatus, the combination with the brakes, of a transverse shaft, a pair of friction-wheels thereon, means for moving said shaft longitudinally comprising collars on said shaft, an eccentric between said collars and a longitudinal shaft upon which said eccentric is mounted, a drum on said shaft and a connection from said drum to the brake whereby the rotation of said shaft sets said brakes, automatic means for locking the brakes so set, and means for releasing said automatic means from either end of the car, substantially as described.

7. In a braking apparatus, the combination with the brakes, of a transverse shaft, a pair of friction-wheels thereon, means for moving said shaft longitudinally comprising collars on said shaft, an eccentric between said collars and a longitudinal shaft upon which said eccentric is mounted, a drum on said shaft, a connection from said drum to the brake whereby the rotation of said shaft sets the brakes, and means for setting said brakes from either side of a locomotive-cab, substantially as described.

8. In a braking apparatus, the combination with the brakes, of a transverse shaft, a pair of friction-wheels thereon, means for moving said shaft longitudinally comprising collars on said shaft, an eccentric between said collars and a longitudinal shaft upon which said eccentric is mounted, a drum on said shaft, a connection from said drum to the brake whereby the rotation of said shaft sets said brakes, and means for applying steam to so set said brakes, substantially as described.

9. In a braking apparatus, the combination with the brakes, of a transverse shaft, a pair of friction-wheels thereon, means for moving said shaft longitudinally comprising collars on said shaft, an eccentric between said collars and a longitudinal shaft upon which said eccentric is mounted, a drum on said shaft, a connection from said drum to the brake whereby the rotation of said shaft sets said brakes, and means located at each side of a locomotive-cab for applying steam to set said brakes, substantially as described.

10. In a braking apparatus the combination with the brakes, of means for applying the brakes comprising mechanism for bringing the faces of the brakes up to the wheels or track, and mechanism for holding said brakes in such position comprising a friction device adapted to derive its motion from the motion of the wheels and means for bringing said friction device into position to so derive its motion, and means for applying water to the track to cause the brakes to hold, substantially as described.

11. In a braking apparatus, the combination of a pair of wheel-brake shoes, a track-brake shoe, an eccentric, a collar on said eccentric, links connecting said shoes with said collar, a rod attached to said eccentric for revolving the same to set the brakes, a transverse shaft, an arm thereon attached to said rod, a drum, a shaft therefor, a rope around said drum, an arm on the transverse shaft attached to said rope, a friction-wheel on the drum-shaft arranged to be brought into contact with a wheel of the vehicle to be braked, and means for so moving said friction-wheel into contact to revolve the drum to set the brakes, substantially as described.

12. In a braking apparatus, the combination of a pair of wheel-brake shoes, a rod engaging recesses in said shoes for maintaining them in the proper relative position, a track-brake shoe, an eccentric, a collar on said eccentric, links connecting said shoes with said collar, a rod attached to said eccentric for revolving the same to set the brakes, a transverse shaft, an arm thereon attached to said rod, a drum, a shaft therefor, a rope around said drum, an arm on the transverse shaft attached to said rope, a friction-wheel on the drum-shaft arranged to be brought into contact with a wheel of the vehicle to be braked, and means for so moving said friction-wheel into contact to revolve the drum to set the brakes, substantially as described.

In witness whereof I have hereunto set my hand in the presence of two subscribing witnesses.

GUSTAV EISENKRAMER.

Witnesses:
T. CASTBERG,
BESSIE GORFINKEL.